(12) United States Patent
Burshan

(10) Patent No.: US 7,568,220 B2
(45) Date of Patent: Jul. 28, 2009

(54) CONNECTING VPN USERS IN A PUBLIC NETWORK

(75) Inventor: Chen Yehezkel Burshan, Tel Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 830 days.

(21) Appl. No.: 11/110,188

(22) Filed: Apr. 19, 2005

(65) Prior Publication Data

US 2006/0236378 A1 Oct. 19, 2006

(51) Int. Cl.
*G06F 17/00* (2006.01)
(52) U.S. Cl. .......................................................... 726/4
(58) Field of Classification Search ....................... 726/4
See application file for complete search history.

(56) References Cited

U.S. PATENT DOCUMENTS

| | | | |
|---|---|---|---|
| 5,611,049 A | 3/1997 | Pitts | |
| 5,926,834 A | 7/1999 | Carlson et al. | |
| 5,987,506 A | 11/1999 | Carter et al. | |
| 6,032,216 A | 2/2000 | Schmuck et al. | |
| 6,085,234 A | 7/2000 | Pitts et al. | |
| 6,119,151 A | 9/2000 | Cantrell et al. | |
| 6,195,650 B1 | 2/2001 | Gaither et al. | |
| 6,356,863 B1 | 3/2002 | Sayle | |
| 6,574,618 B2 | 6/2003 | Eylon et al. | |
| 6,718,372 B1 | 4/2004 | Bober | |
| 6,748,502 B2 | 6/2004 | Watanabe et al. | |
| 2004/0210604 A1 | 10/2004 | Li et al. | |

FOREIGN PATENT DOCUMENTS

WO WO 2005/020035 3/2005

OTHER PUBLICATIONS

Telecom Trends, Dec. 2007.*
Anton B et al., "Best current practices for wireless internet service provider (WISP) roaming", Wireless ISP Roaming, Feb. 2003, pp. 1-37.
Nomadix: "Hotspot Gateway. Public-access Application" [Online], Jan. 16, 2003.
Rigney, et al., "Remote Authentication Dial-in User Service (RADIUS)", published as RFC 2865, Jun. 2000.
Blunk and Vollbrecht, "PPP Extensible Authentication Protocol (EAP)", published as IETF RFC 2284, Mar. 1998.
www.cisco.com/en/US/products/hw/vpndevc/ps2284.
www.cisco.com/enUS/tech/tk543/tk545/technologies_white_paper09186a0080123415.shtml.
Page, et al., "Perspectives on optimistically replicated, peer-to-peer filing", Software: Practice and Experience 28(2), 1998, pp. 155-180.
Guy, et al., "Implementation of the ficus replicated file system", Proceedings of the Summer USENIX Conference (Anaheim, CA, Jun. 1990), pp. 63-71.

(Continued)

*Primary Examiner*—David Y Jung
(74) *Attorney, Agent, or Firm*—Abelman, Frayne & Schwab

(57) ABSTRACT

A method for connecting a user computer to a first computer network includes transmitting a connection request by the user computer, via a second computer network, requesting a connection to the first computer network. The second computer network is automatically solicited to authorize the user computer, responsively to a failure of the connection request. Upon authorization by the second computer network, a connection is established between the user computer and the first computer network via the second computer network.

19 Claims, 3 Drawing Sheets

OTHER PUBLICATIONS

Pawlowski, et al., "The NFS Version 4 Protocol", published at the System Administration and Networking (SANE) Conference (May 22-25, 2000 MECC, Maastricht, The Netherlands).

Braam, et al., "Removing bottlenecks in distributed filesystems: Coda and Intermezzo as examples", published in the proceedings of Linux Expo 1999 (May 1999).

Maughan et al., "Internet Security Association and Key Management Protocol (ISAKMP)", published as RFC 2408, Nov. 1998.

Harkins et al., "Internet Security Key Exchange (IKE)", published as RFC 2409, Nov. 1998.

Kent et al., "Security Architecture for the Internet Protocol", published as RFC 2401, Nov. 1998.

* cited by examiner

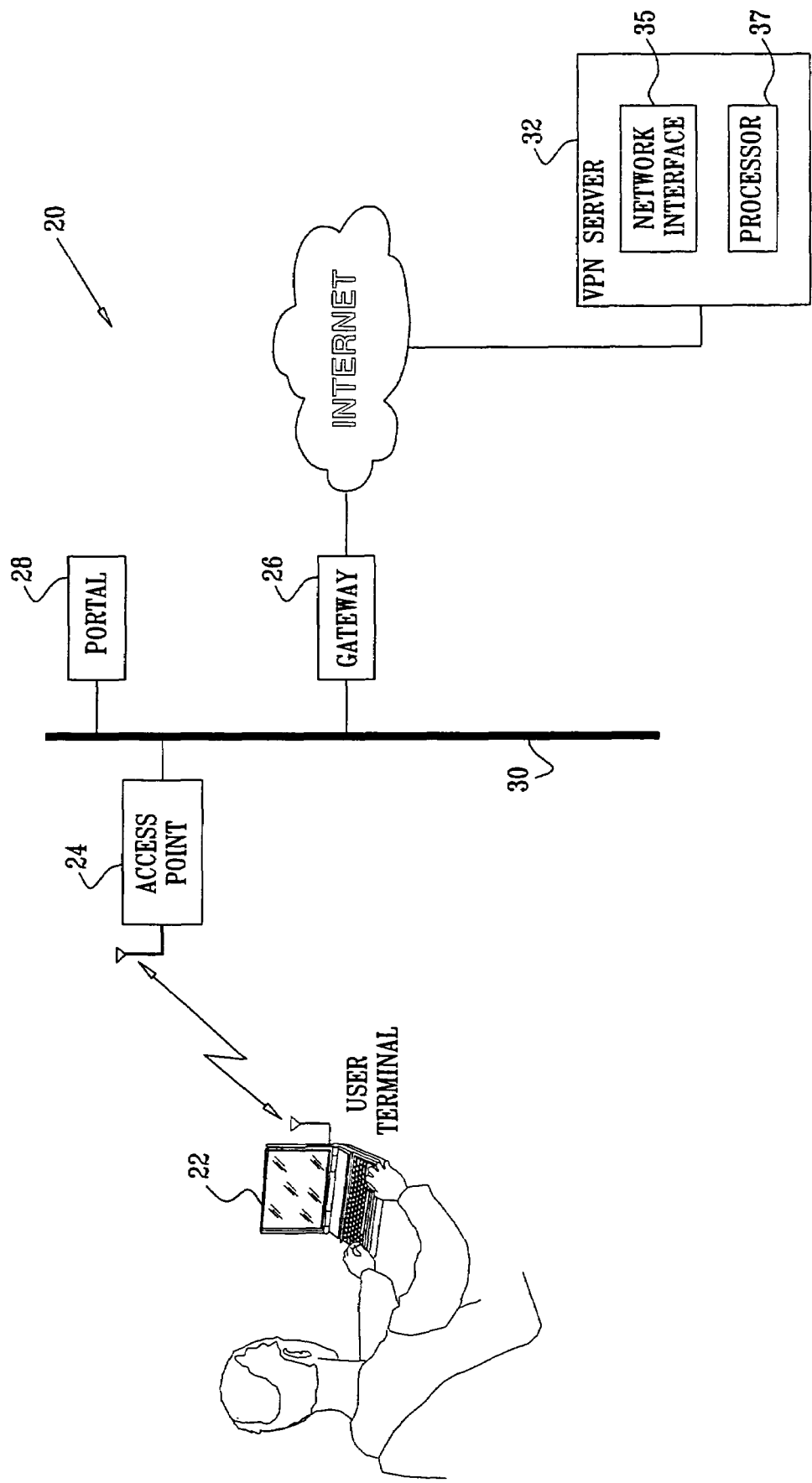

CONNECTING VPN USERS IN A PUBLIC NETWORK

FIELD OF THE INVENTION

The present invention relates generally to computer networks, and particularly to methods and systems for connecting users in public-access computer networks.

BACKGROUND OF THE INVENTION

Many organizations allow remote access by employees to the corporate computer network via the Internet. Such remote connection is commonly implemented using a VPN (Virtual Private Network). A VPN is a secure way to communicate with a private network through a public network such as the Internet. Several companies offer VPN products. For example, Cisco Systems, Inc. (San Jose, Calif.) offers a family of VPN products for both the network side and the client side of the VPN connection. Additional details regarding Cisco VPN products can be found at www.cisco.com/en/US/products/hw/vpndevc.

In some VPN applications, VPN client software is installed on the user's computer. The VPN client establishes a secure "VPN tunnel" to a VPN server located in the corporate network. For example, Cisco Systems offers a VPN client of this sort, which is described in www.cisco.com/en/US/products/sw/secursw/ps2308.

VPN users often connect to the Internet using a WLAN (Wireless Local Area Network, also referred to as Wi-Fi) enabled laptop computer in a hotspot. (A hotspot is a public location, such as a hotel lobby or coffee-shop, that provides wireless Internet access to WLAN-enabled computers.) Several companies offer products that allow users to gain Internet access via hotspots. For example, Cisco Systems offers products known as SSG (Service Selection Gateway) and SESM (Subscriber Edge Services Manager). SSG/SESM provides subscriber authentication and authorization, service selection, service connection and accounting capabilities to subscribers of Internet services. Additional details regarding SSG/SESM can be found at www.cisco.com/en/US/tech/tk888/tk890/tech_protocol_family_home.html.

Several companies provide Internet roaming services (allowing customers of a given service provider to connect to a network of another service provider, for example via a hotspot) and associated client software. Two examples of such providers are ipass, Inc. (Redwood Shores, Calif.) and Boingo Wireless, Inc. (Santa Monica, Calif.). Additional details can be found at the company web sites www.ipass.com and www.boingo.com, respectively. Both companies provide their clients with dialer software that includes an HTTP (Hypertext Transfer Protocol) client.

Guidelines for connecting roaming users to the Internet via hotspots are described by Anton et al., in a paper entitled "Best Current Practices for Wireless Internet Service Provider (WISP) Roaming," Wi-Fi Alliance—WISPr, version 1.0, February 2003, which is incorporated herein by reference. The paper describes recommended operational practices, technical architecture, and an authentication, authorization, and accounting (AAA) framework for enabling subscriber roaming among Wi-Fi based Wireless Internet Service Providers (WISPs). The roaming framework described allows using Wi-Fi compliant devices to roam into Wi-Fi enabled hotspots for public access and services. Additional details regarding WISPr can be found at www.wi-fiialliance.org/opensection/wispr.asp.

The AAA functions associated with the connection of users to private networks via the Internet are described in the patent literature. For example, U.S. Patent Application Publication 2003/0051041, whose disclosure is incorporated herein by reference, describes a converged network accessible by client terminals. The converged network includes a wide area network, a local area network, and a gateway linked to the wide area and local area networks. The gateway integrates billing and authentication functions of the wide area and local area networks. Other examples of solutions related to VPNs and public access networks are described in U.S. Patent Application Publications 2002/0120872, 2003/0182556, and 2004/0181663, whose disclosures are also incorporated herein by reference.

The present invention will be more fully understood from the following detailed description of the embodiments thereof, taken together with the drawings in which:

BRIEF DESCRIPTION OF THE DRAWINGS

FIG. 1A is a block diagram that schematically illustrates a computer network, in accordance with an embodiment of the present invention;

DETAILED DESCRIPTION OF EMBODIMENTS

Figure 1B:
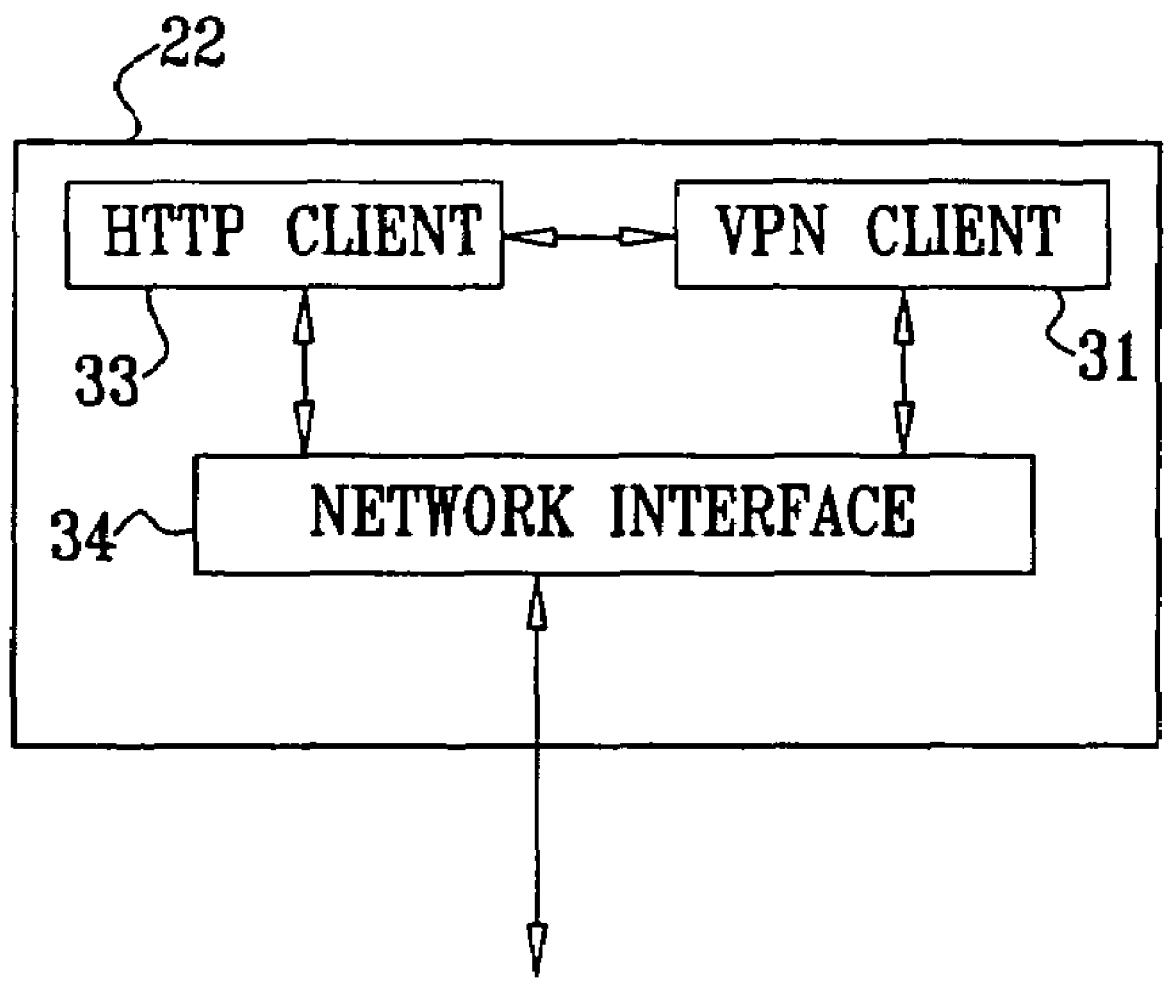
FIG. 1B is a block diagram that schematically illustrates a user terminal, in accordance with an embodiment of the present invention.

In many cases, companies provide their employees with only limited control over the configuration of their computers, including mobile computers. In particular, the company may require that the computer connect to the VPN during the logon sequence before performing any application functions. (Mobile users may connect via a VPN tunnel through a public network to which they are connected.) This scenario is common in organizations that are particularly sensitive to information security, such as financial institutions. When such computer is turned on and a login is attempted, the VPN client installed on the computer immediately attempts to contact the VPN server in order to establish the VPN tunnel. No traffic is allowed to be sent or received by the computer outside of the VPN tunnel.

This configuration often limits the computer's ability to gain Internet access in hotspots and other public access networks. Although some hotspots allow free access, there is a growing number of hotspots in which newly-joining computers are initially redirected to a portal for providing authentication and billing information, as part of the hotspot AAA process. No traffic from the computer is allowed to reach the Internet before the hotspot AAA process is completed. Since the redirection and authentication requires the computer to communicate with the portal outside of the VPN tunnel (which has not yet been established), computers that are configured with the logon sequence described above are typically denied access to the hotspot. This situation may occur not only in hotspots, but also in other Internet access locations.

Embodiments of the present invention resolve this limitation by providing an additional, limited-functionality authorization client on the mobile computer for the purpose of AAA functions. This client is typically configured for a limited suite of HTTP communications. The authorization client is automatically invoked by the VPN client when the latter fails to establish the VPN tunnel. The authorization client communicates with the portal, interacts with the user to provide the necessary billing information and enables the portal to complete the AAA process. The computer is then granted access to the Internet, and the VPN client is able to communicate with the VPN server and establish the VPN tunnel.

The disclosed methods and systems thus enhance the ability of a user to access his or her corporate network through the Internet via a variety of public access networks, without compromising the data security of the organization.

System Description

FIG. 1A is a block diagram that schematically illustrates a computer network 20, in accordance with an embodiment of the present invention. System 20 comprises user terminals 22, typically belonging to roaming users. Each user terminal 22 communicates with an access point 24 using a WLAN connection. Typically, the access point provides WLAN coverage in a public hotspot such as a hotel lobby or airport lounge. A gateway 26 connects the hotspot users to the Internet. The user terminal communicates, via the access point and the gateway, with a portal 28 for authentication, authorization and billing, using methods described below. Gateway 26 may comprise a Cisco SSG gateway, as described above, or any other suitable product. Portal 28 may comprise a Cisco SESM portal, as described above, or any other suitable product. Access point 24, gateway 26 and portal 28 are typically connected using a LAN (Local Area Network) 30.

In a typical hotspot, gateway 26 identifies newly-joining computers that have not been authenticated, and redirects them to portal 28 using TCP redirection. As part of the AAA process, the portal asks user terminal 22 to provide billing information that will enable charging the user for Internet access. This identification may comprise, for example, credit-card information or a username and password registered with the hotspot operator. Any other suitable identification and authorization method may also be used. Once the user provides valid billing information to the portal, the portal sends to the gateway an approval for granting the user Internet access via the hotspot.

Some of user terminals 22 belong to users who are trying to gain access to their corporate networks via the Internet using a VPN. As described above, access to the corporate network is achieved once a VPN tunnel is established between user terminal 22 and a VPN server 32. VPN server 32 comprises a network interface 35 for communicating over the Internet, and a communication processor 37 for establishing and managing the virtual private network.

The exemplary network configuration shown in FIG. 1A was chosen for the sake of conceptual clarity. Other network configurations may use the methods and systems described herein. For example, the VPN server is typically part of a corporate private network (not shown in the figure). The corporate network may comprise additional nodes such as VPN-enabled switches, routers and firewalls. Similarly, the methods described below are equally applicable in other public access configurations, including both wireless and wired access, as will be apparent to those skilled in the art.

FIG. 1B is a block diagram that schematically illustrates hardware and software elements of user terminal 22, in accordance with an embodiment of the present invention. The user terminal comprises a VPN client 31, which establishes the VPN tunnel with VPN server 32. The user terminal also comprises an authorization client, implemented in this embodiment as an HTTP client 33, which is invoked by VPN client 31, as will be explained hereinbelow. Clients 31 and 33 communicate with the network via a network interface 34.

Although the embodiments described herein address mainly the connection of VPN users, applications other than VPN may also use the disclosed methods and systems. Other communication clients may be used instead of VPN client 31, and other communication servers may be used instead of VPN server 32, mutatis mutandis, as required by the application.

Although in the description of FIG. 1A above, the user terminal is connected via a wireless connection, the user terminal may alternatively connect to the Internet through a wired LAN connection, such as public LANs provided in hotel rooms and conference centers. Such LANs also redirect newly-joining computers to a portal for authentication. The disclosed methods and systems are also applicable to DSL Internet connections, as used by employees connecting to the corporate network from home or from a remote office, or any other Ethernet/broadband connection. Accordingly, network interface 34 may comprise either a wireless or a wired interface.

Typically, user terminal 22 and VPN server 32 are implemented using general-purpose computers, which are programmed in software to carry out the functions described herein. The software may be downloaded to the computers in electronic form, over a network, for example, or it may alternatively be supplied to the computer on tangible media, such as CD-ROM. The functions of user terminal 22 are typically integrated with other computing functions on the user's computer. VPN server 32 may be implemented as a standalone unit. Alternatively, the functions of VPN server 32 may be integrated with other computing functions of the corporate network (not shown in the figures).

Connection Method Description

Figure 2:
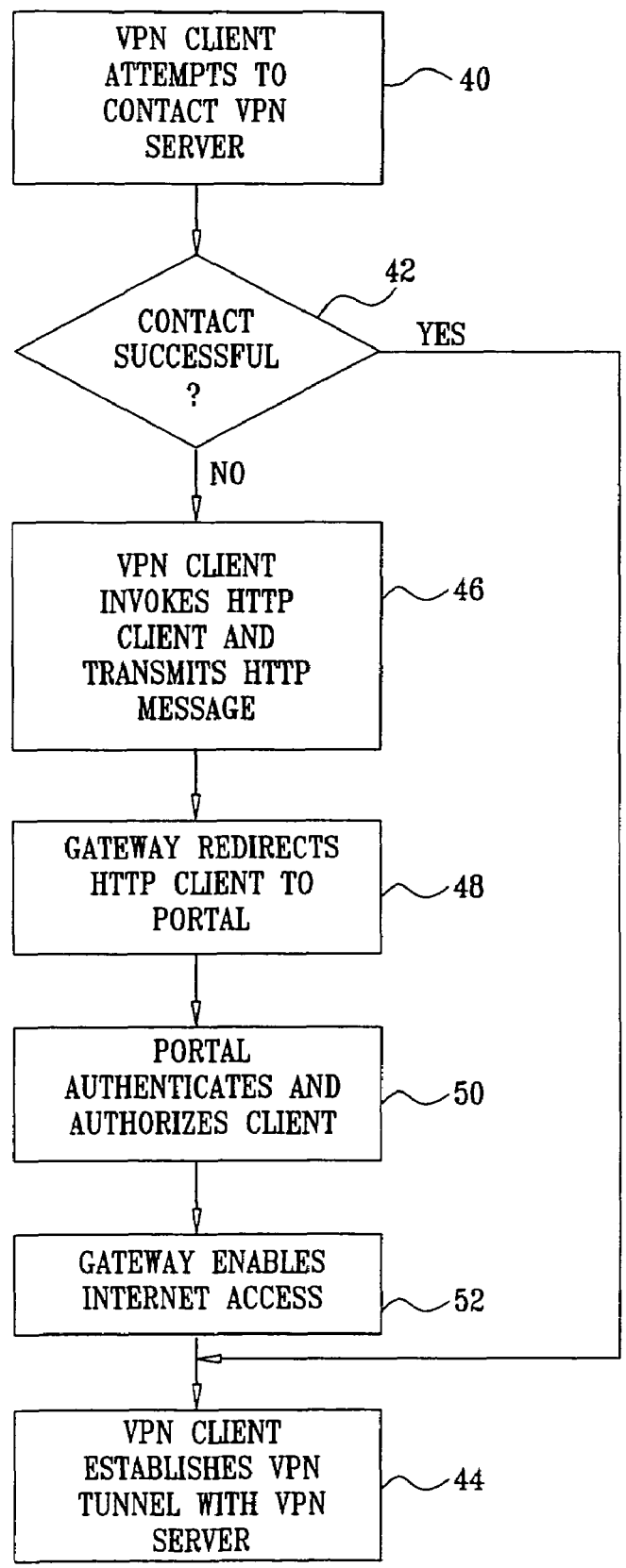
FIG. 2 is a flow chart that schematically illustrates a method for connecting a VPN user to a corporate network, in accordance with an embodiment of the present invention.

FIG. 2 is a flow chart that schematically illustrates a method for connecting a VPN user to a VPN, in accordance with an embodiment of the present invention. The method typically begins when a roaming user attempts to gain Internet access in a hotspot, for connecting to his or her corporate network. The user's computer is started-up inside the hotspot. The computer is assumed to be configured so that the VPN client launches immediately when a login is attempted after power-up, as described above.

VPN client 31 sends a request message via interface 34 to VPN server 32, attempting to establish a VPN tunnel, at a tunnel requesting step 40. The VPN client checks whether the VPN server was contacted successfully, at a checking step 42. The VPN client repeats steps 40 and 42 periodically, typically every 20 seconds. Typically, the VPN client waits for several failed connection requests before declaring a failure to establish the VPN tunnel at checking step 42.

Additionally or alternatively, VPN client 31 may be configured to contact more than one VPN server 32 at step 40, as a redundancy measure against possible VPN server failures. The configuration of VPN client 31 may comprise a definition of a primary and a secondary VPN server, or a list of VPN servers. Therefore, tunnel requesting step 40 may comprise a sequence of attempts to contact one or more VPN servers. Checking step 42 is successful if an attempt to contact one of the VPN servers is successful. Checking step 42 is unsuccessful if none of the VPN servers was contacted successfully.

The messaging protocol used between the VPN client and the VPN server may comprise any suitable protocol such as HTTP, or any proprietary protocol over TCP/IP or UDP. Regardless of the protocol used, in some cases it is preferable that the request message sent by the VPN client use explicit IP addresses rather than DNS names, to avoid issues of static DNS settings. Alternatively, some systems such as the Cisco SESM/SSG products cited above provide "plug and play" solutions for resolving static DNS scenarios in which the client is configured with the server DNS name and not with the IP address. The protocol comprises a predefined response message sent by the VPN server via interface 35, for proving to the VPN client that the VPN server was indeed contacted successfully and that it is ready to establish the tunnel.

The predefined response message is particularly desirable when HTTP is chosen as the transport protocol between the VPN client and VPN server. As will be described below, HTTP messages sent by user terminal 22 before it is authenticated are typically redirected by gateway 26 to portal 28 using TCP redirection. Portal 28 will typically generate an HTTP response message, but not the message that the VPN client expects to receive from the VPN server. The predefined response message from the VPN server enables the VPN client to ignore irrelevant HTTP messages, such as responses from the portal. Alternatively, if a protocol other than HTTP is used between the VPN client and the VPN server, the request messages sent by the VPN client will be most likely discarded by the gateway. The last alternative is sometimes preferred, since it typically does not require changes in the VPN server, and can be based merely on the failure of the VPN client to contact the VPN server (see checking step 42 above).

In one embodiment, the response message from VPN server 32 is an HTTP message comprising XML content. The VPN client parses the XML content according to a predefined XML schema, as is known in the art. If the XML content is parsable by the VPN client, and is found identical to a predefined content, the VPN client assumes that the VPN server has been contacted successfully. Optionally, different VPN servers may use the same XML schema with different attribute values as predefined response messages. Using this method, different VPNs may be configured using the same response message, each VPN identified by a different attribute value. Alternatively, any other suitable message content may be used as the predefined response message.

Returning to the description of FIG. 2, if the VPN server has been contacted successfully, as checked by step 42, the VPN client establishes the VPN tunnel, at a tunnel setup step 44. At this stage the user is successfully connected to the corporate network through the VPN tunnel and the method terminates.

If, on the other hand, the VPN client fails to contact the VPN server, as checked by step 42, the VPN client assumes the reason for the failure is a lack of authentication with the hotspot. The VPN client then invokes HTTP client 33, at an HTTP invoking step 46. (Although the VPN client continues to repeat steps 40 and 42 periodically, step 46 is typically performed only once, so that no more than one instance of HTTP client 33 is actually launched. In other words, the VPN client invokes the HTTP client only on the first pass through step 42.) HTTP client 33 is designed to provide only limited functionality and user interfaces, mainly for the sake of data security. For example, if a fully-functional HTTP browser were to be invoked at step 46, the user would have the ability to access the local disk drives of the computer, as well as perform other unauthorized actions, not necessarily related to network connectivity, without connection to and control by the VPN. Therefore, HTTP client 33 typically does not provide the user with a URL command line. The only purpose of HTTP client 33 is to enable the AAA process and its functionality and user-interfaces are limited accordingly.

Alternatively, in other applications of the present invention, the HTTP client may be provided with additional functionality as appropriate for the application. Further alternatively, the HTTP client may comprise a conventional client, such as the iPass or Boingo software cited above.

When invoked by the VPN client, HTTP client 33 transmits an arbitrary HTTP message via interface 34. Gateway 26 intercepts the arbitrary message, identifies its source as an unauthenticated computer, and redirects the computer to portal 28 for authentication, at a redirection step 48. Typically, the redirection is implemented using a TCP redirection procedure.

As noted above, VPN client 31 may continue to attempt to contact the VPN server in parallel to steps 46-52. Since user terminal 22 is not yet authorized by the portal, the request messages transmitted by the VPN client are typically discarded by gateway 26.

Portal 28 communicates with HTTP client 33 for authenticating and authorizing user terminal 22, at an AAA step 50. In particular, the portal asks the user to provide billing information that will enable the hotspot operator to bill the user for Internet access. Several methods are known in the art for authenticating users and billing them for access to computer networks, and any suitable method of this sort may be used for implementing step 50. For example, the user may be prompted, using the GUI (Graphical User Interface) of HTTP client 33, to enter his or her credit card information. Alternatively, the user may be asked to login using a valid username or other credentials. The credentials identify the user as the owner of an account registered with the hotspot operator (or with a service provider who has a roaming agreement with the hotspot operator). Further alternatively or additionally, HTTP client 33 may be preconfigured with the necessary information, so that step 50 takes place without user interaction at all.

The portal may validate the billing information supplied by the user and/or apply additional authentication or authorization methods for validating the identity of the user, as are known in the art. In one embodiment, at the conclusion of step 50, the HTTP client may present a GUI message to the user, indicating that the authentication and authorization is completed and that the VPN tunnel may now be established.

Following completion of the AAA process of step 50, portal 28 informs gateway 26 that user terminal 22 has been authorized to access the Internet via the hotspot. (In some cases, gateway 26 is part of the authentication and authorization flow. In these cases the portal requests the gateway to authenticate and authorize the user terminal. If successful, the gateway informs the portal that the user terminal is authenticated and authorized.)

The gateway, responsively to the approval of the portal, enables Internet access to user terminal 22, at an access enabling step 52. At this stage, all messages transmitted by user terminal 22 are sent to their destinations over the Internet through gateway 26. In particular, the request messages from VPN client 31 to VPN server 32 are now allowed to reach the VPN server. As noted above, VPN client 31 may have continued transmitting these request messages periodically in parallel to the authentication process described in steps 46-52. Alternatively, HTTP client 33 may prompt the VPN client upon completion of step 50. In either case, the method terminates with the VPN client establishing the VPN tunnel, at tunnel setup step 44.

Although the methods and systems disclosed hereinabove address mainly the connection of users to a corporate network using VPN over the Internet, the principles of the present invention may also be used in conjunction with other applications that involve connecting users securely to a private network via a public network. It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for connecting a user computer to a virtual private network (VPN) on a first computer network via a second computer network, the method comprising:

providing in the user computer a limited-functionality authorization client;

automatically transmitting a connection request to the VPN by the user computer, via the second computer network;

responsively to a success of said connection request, automatically sending a predefined response message by the VPN to the user computer;

responsively to receiving said predefined response message by the user computer, automatically establishing a connection between the user computer and the VPN via the second computer network;

responsively to a failure of said connection request, automatically terminating said automatically transmitting a connection request to the VPN;

responsively to a failure of said receiving said predefined response message by the user computer, automatically terminating said automatically transmitting a connection request to the VPN;

responsively to said automatically terminating, automatically soliciting the second computer network to authorize the user computer via said limited-functionality authorization client; and upon authorization by the second computer network, establishing a connection between the user computer and the VPN via the second computer network, wherein automatically soliciting the second computer network comprises, upon failure of said connection request, invoking said authorization client for authorizing the user computer in the second computer network.

2. The method according to claim 1, wherein establishing said connection comprises establishing a tunnel through the second computer network to the VPN.

3. The method according to claim 2, wherein the second computer network comprises a public network.

4. The method according to claim 1, wherein transmitting the connection request via the second computer network comprises requesting Internet access via a wireless connection in a hotspot.

5. The method according to claim 1, wherein transmitting the connection request comprises transmitting the request periodically, until completion of the authorization by the second computer network.

6. The method according of claim 1, wherein the authorization client is configured to communicate with the second computer network using a Hypertext Transfer Protocol (HTTP).

7. The method according of claim 1, wherein the authorization client is configured to permit a user to perform only authorization-related actions until the authorization of the user computer by the second computer network is completed.

8. The method according to claim 1, wherein establishing the connection between the user computer and the virtual private network (VPN) comprises receiving at the user computer predefined XML content from the VPN responsively to the connection request, and parsing the XML content according to a predefined XML schema so as to validate the XML content.

9. The method according to claim 1, wherein soliciting the second computer network comprises causing the second computer network to request and receive billing information from the user computer.

10. Apparatus for connecting a user computer to a virtual private network (VPN) on a first computer network via a second computer network, the apparatus comprising:

a network interface, which is arranged to communicate with the second computer network; and a limited-functionality authorization client in the user computer, which is coupled to the network interface so as to transmit a connection request, via the second computer network, requesting a connection to the VPN, and which is arranged, responsively to a failure of the connection request, to automatically solicit the second computer network to authorize the user computer, and upon authorization by the second computer network, to establish a connection between the user computer and the VPN via the second computer network, wherein the user computer is configured to invoke said authorization client upon failure of the connection request, wherein said authorization client is arranged to authorize the user computer in the second computer network.

11. The apparatus according to claim 10, wherein the user computer is arranged to establish a tunnel through the second computer network to the virtual private network.

12. The apparatus according to claim 11, wherein the second computer network comprises a public network.

13. The apparatus according to claim 10, wherein the network interface comprises a wireless interface, and wherein the user computer is arranged to request Internet access via a wireless connection in a hotspot.

14. The apparatus according to claim 10, wherein the user computer is arranged to transmit the connection request periodically, until completion of the authorization by the second computer network.

15. The apparatus according of claim 10, wherein said authorization client is arranged to communicate with the second computer network using a Hypertext Transfer Protocol (HTTP).

16. The apparatus according of claim 10, wherein said authorization client is arranged to permit a user of the computer to perform only authorization-related actions until the authorization of the user terminal by the second computer network is completed.

17. The apparatus according to claim 10, wherein the user computer is arranged to receive predefined XML content from the virtual private network (VPN) responsively to the connection request, and to parse the XML content according to a predefined XML schema so as to validate the XML content.

18. The apparatus according to claim 10, wherein the user computer is arranged to cause the second computer network to request and receive billing information from the user computer.

19. The apparatus of claim 10, further comprising:

a network interface, which is arranged to communicate with the virtual private network (VPN); and a communication processor, which is coupled to the network interface so as to receive a connection request sent from the user computer via a second computer network, requesting a connection to the VPN, and to transmit predefined XML content to the user computer so as to establish a connection between the user computer and the VPN via the second computer network.

* * * * *